United States Patent [19]
Eastham

[11] 3,866,702

[45] Feb. 18, 1975

[54] ACCELERATOR FOR CAR TRANSMISSION SYSTEM

[75] Inventor: John Frederick Eastham, Long Ditton, England

[73] Assignee: K. G. Engineering Laboratories Limited, Birmingham, Warwickshire, England

[22] Filed: July 2, 1973

[21] Appl. No.: 375,643

[30] Foreign Application Priority Data
July 26, 1972 Great Britain .................... 35009/72

[52] U.S. Cl. ................ 180/65 R, 318/139, 318/227
[51] Int. Cl. ............................................. B60k 1/00
[58] Field of Search .......... 180/65 R; 318/139, 227, 318/231, 376

[56] References Cited
UNITED STATES PATENTS
| | | | |
|---|---|---|---|
| 1,423,090 | 7/1922 | Delano | 180/65 R |
| 3,179,199 | 4/1965 | Moran | 180/65 R |
| 3,514,681 | 5/1970 | Dorn et al. | 180/65 R |
| 3,628,621 | 12/1971 | Lee | 180/65 R |

FOREIGN PATENTS OR APPLICATIONS
| | | | |
|---|---|---|---|
| 1,104,354 | 2/1968 | Great Britain | 180/65 R |

Primary Examiner—Richard A. Schacher
Assistant Examiner—James M. Slattery
Attorney, Agent, or Firm—Parmelee, Miller, Welsh & Kratz

[57] ABSTRACT

A battery driven car provided with an inverter supplying an induction motor which drives the wheels, has the speed of the motor and its torque controlled by the frequency and power output of the inverter. This is controlled by an analogue voltage obtained from an accelerator pedal assembly and by a second analogue voltage obtained from a tachometer driven by the motor. The accelerator pedal has a rest position corresponding to idling of the induction motor and two ranges of movement. Movement of the accelerator pedal through the first range of movement causes a slip speed signal from the accelerator pedal assembly to diminish progressively in a range corresponding to the generation of a negative torque by the induction motor, and during the second range the slip speed signal increases progressively corresponding to a positive torque being produced by the induction motor.

13 Claims, 11 Drawing Figures

ACCELERATOR FOR CAR TRANSMISSION SYSTEM

INTRODUCTION

This invention relates to a drive system utilising a rechargeable battery as its source of power.

BACKGROUND TO THE INVENTION

Although many forms of power source for an electric car have been suggested, the conventional lead/acid battery developed over many years has proved itself to have the ruggedness and reliability necessary for a car drive system and is also capable of being recharged and of being relatively cheaply produced despite its high level of sophistication. It is therefore a preferred choice as a source of electrical power, at least at the present time, despite its weight and size.

Most battery car drive systems use direct current (d.c.) series motors. These machines are, of course, commutator motors and hence require regular brush maintenance. In addition, the rotor carries an insulated coil winding in its slots which limits the peripheral speed. This in turn restricts the output from a particular frame size. The machine also produces a system disadvantage in that regeneration, from an overhauling load, is difficult to arrange in that it requires a change in circuit configuration.

The use of a squirrel cage induction motor as a drive means is capable of avoiding the above-mentioned disadvantages as the squirrel cage rotor can have a robust winding consisting of a set of cast aluminium bars with integral end-rings. Such rotors can spin at high speed without damage and do not require a commutator or brush gear. The induction motor can, in addition, provide a system advantage in that regeneration is possible without a change in the main power connections. However, an induction motor inherently requires a polyphase alternating current (a.c.) supply and this means that an inverter is necessary in order to provide an alternating current supply from a d.c. source such as a battery.

When energised, the stator coils of a polyphase induction motor produce a rotating field pattern. The rotational speed ($\omega s$) depends on the number of pole pairs ($2p$) produced by the winding and the frequency ($f$) of the current supplied. The speed of an induction motor is relatively close to the synchronous speed which is expressed by the equation $\omega s = 60 f/p$ r.p.m.

The output torque against rotor speed characteristic of a typical induction motor is shown in the accompanying FIG. 3A from which it will be noticed that the torque is positive when the rotor speed is below the synchronous speed and negative for all speeds above. In the positive torque, power is supplied to the mechanical output of the motor from the electrical input. In the negative torque region, power is taken from the mechanical system and absorbed electrically so as to give rise to regenerative braking. The ability of an induction motor to brake regeneratively is important in a battery-driven car because a limiting factor on the car range is the battery charge which can be conserved to some extent by making use of regenerative braking to return some of the power to the battery. This enables the car range to be increased without impairing a heavier, large and more costly battery.

Unfortunately, it is difficult to arrange an induction motor to have its maximum torque at standstill without impairing its high speed running efficiency.

Also, when an induction motor is providing positive torque, its efficiency is given by $\omega r/s$ where $\omega r$ is the rotor speed. In other words, for efficient use of an induction motor the rotor speed must be close to the synchronous speed. Although by varying the synchronous speed one could maintain a relatively high efficiency of operation of the induction motor one is still left with the problem that its torque output when controlled this way is approximately constant with speed whereas the torque requirements of a car vary with the terrain and the desired acceleration.

An object of this invention is the provision of a relatively rugged and simple electric drive system for a land vehicle such as a car.

THE INVENTION

In accordance with the present invention a battery drive system for a vehicle includes an induction motor driving the wheels and supplied with current by an inverter fed by the battery and having its output frequency controlled by a bias signal formed in part from a signal significant of the speed of the motor and in part from a signal significant of slip speed and which varies with the position of a manually operable accelerator movable from a rest position, towards which it is resiliently biased, through two consecutive ranges of movement during the first of which the slip speed signal diminishes progressively in a range corresponding to the generation of a negative torque by the induction motor, and during the second range the slip speed signal increases progressively in a range corresponding to a positive torque being produced by the induction motor.

Slip speed is defined as the difference in speeds between the field and the rotor.

An advantage of the invention is that the induction motor produces a degree of regenerative braking as soon as the accelerator is returned to or near its rest position.

PREFERRED FEATURES OF THE INVENTION

If the accelerator is formed as a pedal and the car is provided with a gearbox and clutch as a conventional engine-driven car, a degree of dynamic braking is experienced when slowing down or when "changing-up" through the gears, in much the same way as with an ordinary engine-driven car but the dynamic braking is produced by regenerative braking and is accompanied by the return of electrical power to the battery whose charge is therefore to some extent conserved. Thus, the useful life of the battery can be prolonged and the behaviour characteristics of the car will resemble more closely those of an engine-driven car.

The invention is applicable to any battery drive system using an inverter connected between a battery and an induction motor and, in its broadest sense, it could be utilised with a drive system in which the induction motor is directly connected through gearing to the wheels. However it is preferred, in order to maintain the speed and cooling of the induction motor, to drive the wheels by way of a clutch and gear box which may form a manually actuated or an automatic gear change assembly.

Preferably, the extent of regenerative braking is increased during the initial part of application of a mechanical braking system provided on the car. This is conveniently achieved by arranging for a brake member, such as a pedal, to bias the inverter towards pregressively greater regeneration braking as it is depressed and before conventional frictional braking becomes effective. This is important with a car designed for town traffic because under rush-hour travelling conditions there are long periods when partial application of the brakes is repeatedly taking place to enable the car to keep station in a line of closely spaced cars.

Suitably the frequency of the supply to the motor when the accelerator is in its rest position corresponds to the motor idling speed.

In the preferred arrangement the bias signal fed to the inverter is an aggregate of analogue signals obtained, respectively, from a tachometer driving the motor and providing an analogue output significant of its speed, an analogue value obtained from the accelerator and proportional to the slip speed demand such value being negative or positive depending on the range of movement it is in, and a further analogue signal obtained during initial application of brakes and which supplements the accelerator analogue value in its first range of movement.

The invention will now be described in more detail, by way of examples, with reference to the accompanying drawings, in which:

IN THE DRAWINGS

FIG. 1 is a diagrammatic circuit lay-out of a car;
FIG. 2 shows an inverter circuit as used in FIG. 1;
FIGS. 3A, 3B and 3C are plots of torque against speed to explain operation of the system;
FIG. 4 shows movement of an accelerator pedal;
FIG. 5 shows the effect of portions of such movement on the car's performance.
FIG. 6 shows in diagram A a first modification of the circuit of FIG. 1 where potentiometric transducers are replaced by electromagnetic transducers, diagrams B and C showing graphically operating characteristics obtained by these transducers respectively; and
FIG. 7 shows a second modification in which a charging facility for the battery is provided by way of the inverter.

DESCRIPTION OF PREFERRED EMBODIMENT

Figure 1:
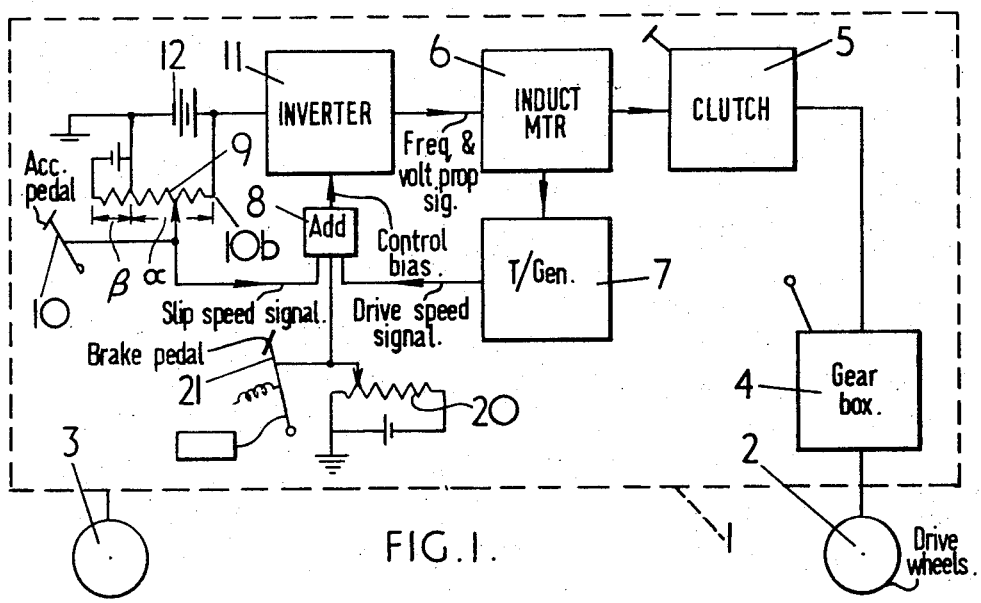

Referring to FIG. 1, a car denoted by the broken outline 1 is provided with road wheels 2, 3 of which the former are driven by way of a gear box 4 which receives drive by way of a pedal operated clutch 5 from an induction motor 6. A tachogenerator 7 is connected to the induction motor shaft and provides an analogue voltage, proportional to the motor speed, to an adder 8 which receives a second analogue voltage from a slider of a potentiometer 9 whose position is controlled by an accelerator pedal 10. The two analogue signals are aggregated in the adder 8 to provide a control bias which is applied to a solid state inverter 11 to control the frequency of its electrical output which is fed to the induction motor 6. The inverter receives power from a battery of lead/acid cells 12 shown diagrammatically and across which the potentiometer 9 is partially connected. The negative terminal of the battery 12 is connected to the chassis of the car.

Figure 2:
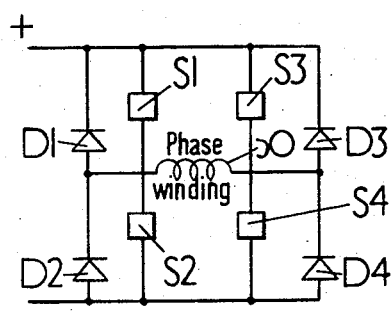

The inverter which is shown in more detail in FIG. 2, could take any one of a number of forms. Its most essential requirement is that it must be capable of allowing power flow in either direction. This means that feed-back rectifiers must be included across each of a number of switching elements which may comprise either thyristors or transistors. FIG. 2 shows one phase of a two-phase inverter and it will be understood that the second phase is the same as the first but switching signals to the switches S1 to S4 of the second phase are so controlled that the output voltage it produces is in quadrature with that of the phase shown in FIG. 2. The inverter operates by means of pulse-width control in order to vary the voltage output and to achieve this the switches S1 and S2 are opened and closed in turn at the basic required output frequency, whilst the switches S3 and S4 are opened and closed alternately at a higher frequency of, say, eight times the basic frequency. In this way a control of the mark-to-space ratio of the switches S1 and S4 modulates and therefore controls the level of the output voltage.

Figure 3A:
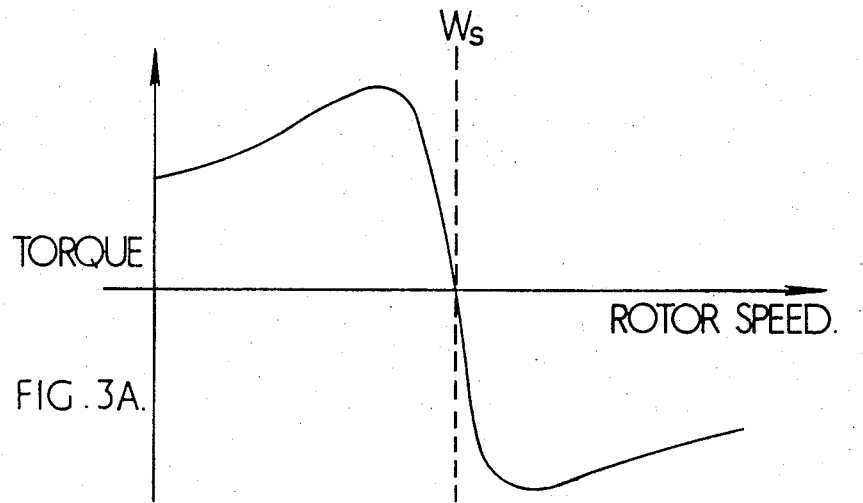
Figure 3B:
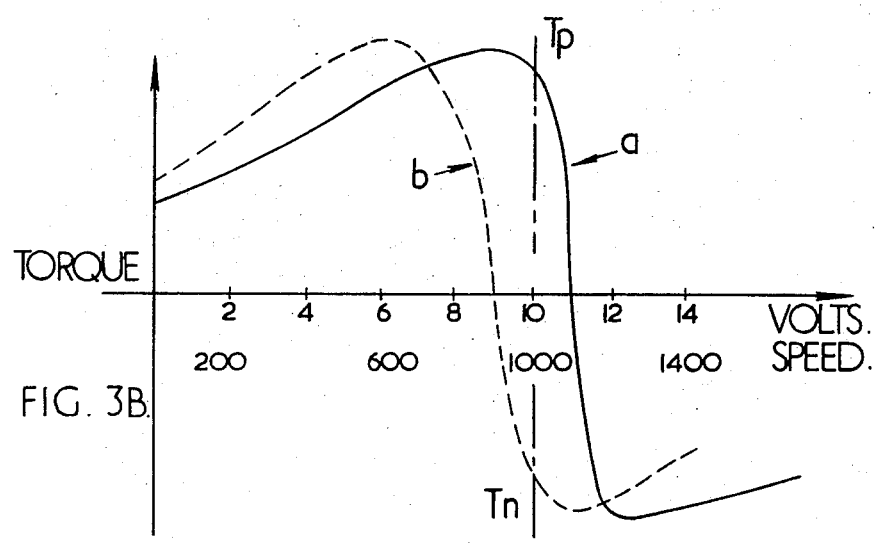

The part of the analogue voltage obtained from the potentiometer 9 to produce the desired output torque is a signal proportional to the slip speed of the induction motor and is signified by the position of the accelerator pedal 10. FIG. 3B illustrates the intended action by means of an example. The chain line in FIG. 3B represents the rotor speed at 1,000 r.p.m. which produces a tachovoltage of 10 volts. in the example under consideration. If a positive torque level corresponding to 100 r.p.m. of slip is required, then 1 volt is added to the tachovoltage and this is applied by way of the adder 8 to the inverter frequency control input. It is arranged that the field speed produced by the inverter supply bears exactly the same relationship to the analogue signals as the tachogenerator voltage output bears to the rotor speed. Therefore, the field speed provided by the inverter for a control voltage of 11 volts is 1,100 r.p.m. This results in the torque characteristic b shown in full outline and therefore a positive torque Tp is produced. Conversely, if a negative torque corresponding to regenerative braking is required from the induction motor when the rotor speed is 1,000 r.p.m., then a 1 volt signal is subtracted from the tachovoltage in the adder 8. The control voltage fed to the inverter 11 then corresponds to a motor speed of 900 r.p.m. and the torque curve shown in broken outline is produced which, at the speed under consideration of the vehicle, produces a negative torque and consequently regenerative braking.

Figure 3C:
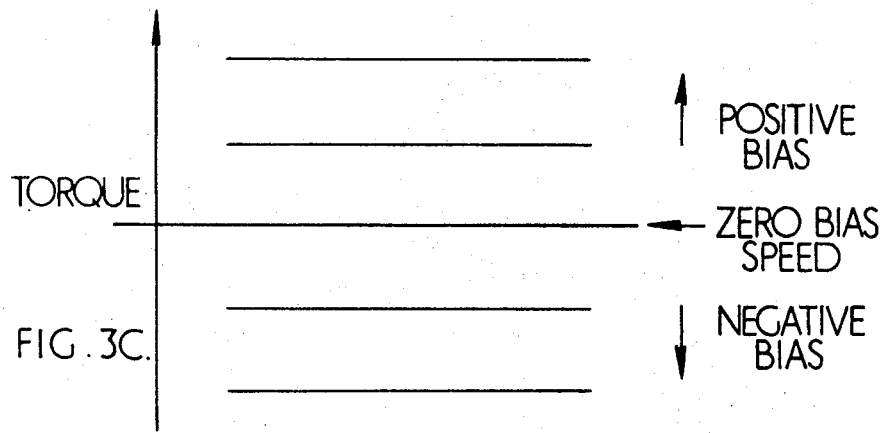

From the example given above it will be apparent that full torque control up to the peak available from the motor can be obtained simply by varying the bias voltage between positive and negative limits and that this control can be exercised at any speed. FIG. 3 C shows the torque output which can be expected at different fixed bias voltage settings.

In practice, the motor voltage requirements will depend on its design but in general the voltage applied should be approximately proportional to the frequency and this is a feature inherent in the inverter design.

Figure 4:
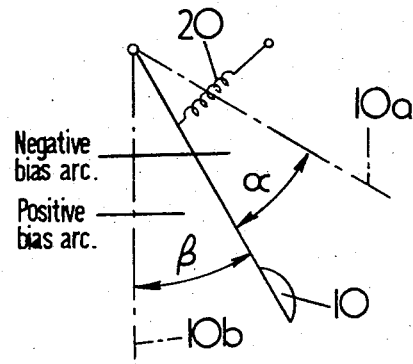
Figure 5:
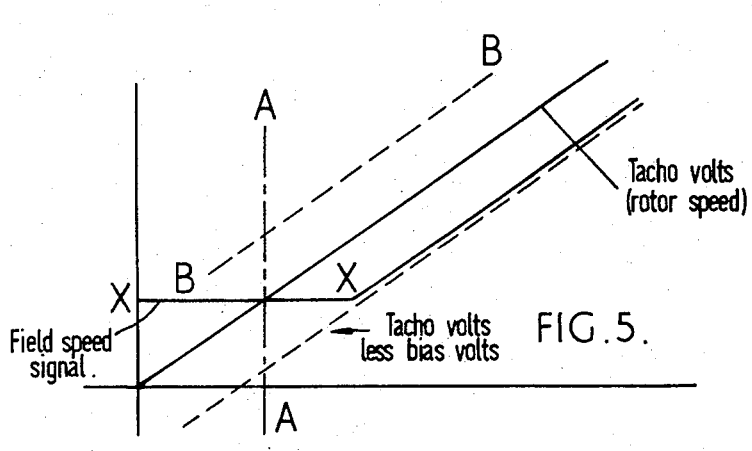

FIG. 4 shows the accelerator pedal 10 in an intermediate position, its two extreme positions being referenced 10a and 10b. The pedal 10 is depressed against the bias of a spring 20 and it travels through a negative bias arc $\alpha$ before reaching the positive bias arc $\beta$. These two bias arcs $\alpha$ and $\beta$ are shown in FIG. 1 and the way in which the torque level applied to the vehicle is varied will be understood with reference to FIG. 5.

OPERATION

The operational sequence on starting the car is as follows. The power is first switched on to the inverter with the gear box in neutral and the accelerated pedal at its position 10a. The speed signal from the tachogenerator 7 is then zero and the inverter bias signal is obtained wholly from the negative portion of the potentiometer 9 and is therefore negative. It is arranged that all control bias signals under a predetermined level indicated by the horizontal line X—X in FIG. 5, produce a minimum inverter frequency. This may be obtained by using a suitable "catching" circuit. For rotor speeds below the line A—A the field speed, held at its minimum value by the catching circuit, is arranged to be greater than the motor speed and a positive torque is produced. The motor would therefore run up to the line A—A which corresponds to the motor idling speed.

The car can now be put in gear with the clutch 5 depressed. The effect of engaging the clutch with the accelerator pedal 10 at its upper limiting position 10a is to place a load on the induction motor 6 causing the tachogenerator output speed signal to fall slightly and the car would run at a speed below A—A in FIG. 5. If the pedal is now depressed to give a positive bias signal corresponding to the broken line B—B then the car would accelerate at the corresponding torque level. The operations have been described separately, however, in practice of course the clutch would be engaged and the accelerator pressed simultaneously as in normal driving technique.

The gear changing to the next ratio is accomplished by first de-clutching and releasing the accelerator. The motor then quickly slows down as a result of the pedal 10 being released into its negative bias arc α and the motor would brake regeneratively to return energy through the inverter to the battery 12. The next gear can then be engaged and the sequence of acceleration continued.

It will therefore be apparent that when the accelerator pedal 10 is released one gets dynamic breaking through the transmission as long as the clutch is engaged as in a conventional motor-driven car utilising engine braking. However, the energy released during this braking is returned to supplement the charge on the battery instead of being dissipated as heat.

In practice, the full measure of regenerative braking would not be built into the accelerator pedal 10 since in any case a mechanically operated brake is provided. The amount of negative bias voltage available from the accelerator pedal should however be sufficient to run the motor down quickly during upward gear changing. This is obtained by controlling the minimum frequency level corresponding to the output of the "catching" circuit.

To provide regeneration during normal braking occurring when a brake pedal 21 is depressed (see FIG. 1) a third input is provided to the adder 8 from a second potentiometer 20. This is connected across a battery providing negative bias which increases when the slider of the potentiometer is moved by the brake pedal 21 which also controls a master braking cylinder of an hydraulic braking system in conventional manner. During braking of the car by means of the brake pedal 21, the first part of the travel of the brake pedal provides only a supplementary negative bias signal to the adder 8 to reduce the inverter output frequency so that the induction motor 6 is braked regeneratively to a greater extent than is possible with the accelerator pedal 10. The hydraulic braking system is not at this time effective. After the first part of the travel of the mechanical brake is completed, the full mechanical braking system takes over to bring the car to a standstill by conventional friction braking and throughout this braking the maximum negative bias signal is applied to the adder 8. A lost-motion linkage (not shown) allows the potentiometer 20 to remain in its maximum negative bias position throughout mechanical braking and irrespective of the position of the brake pedal 21.

FIRST MODIFICATION OF EMBODIMENT

Figure 6A:
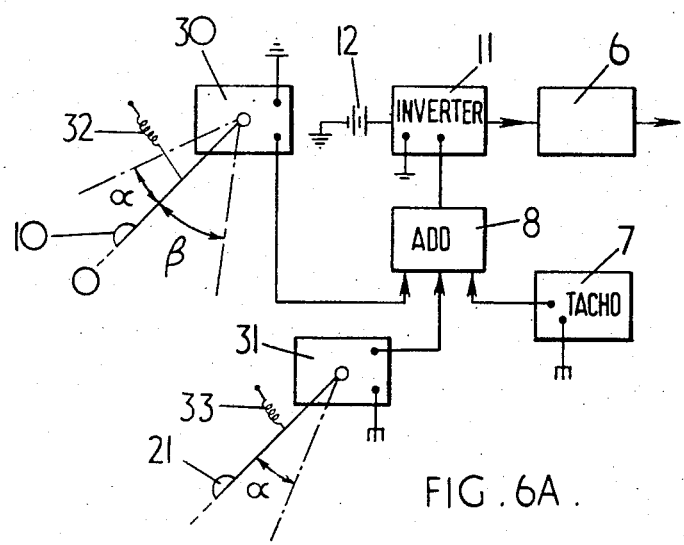

In the first modification shown in FIG. 6A the parts identical to those shown in FIG. 1 are correspondingly referenced. However in place of the potentiometer devices 9 and 20, electromagnetically operated transducers 30 and 31 are provided. Each of the transducers 30 and 31 provides a direct current output giving the slip speed signal and regenerative braking signal, respectively, to the adder 8 which provides the control bias to the inverter 11 as formerly. The direct current output in each case varies linearly with the displacements of the respective associated pedals 10 and 21. The advantage of using electromagnetic transducers is that they can be more sturdily constructed than resistive potentiometer devices. Each may incorporate its own conversion circuits for changing alternating current to direct current and vice-versa. Movement of the pedals 10,21 from their respective rest positions is resisted by respective springs 32, 33.

Figure 6B:
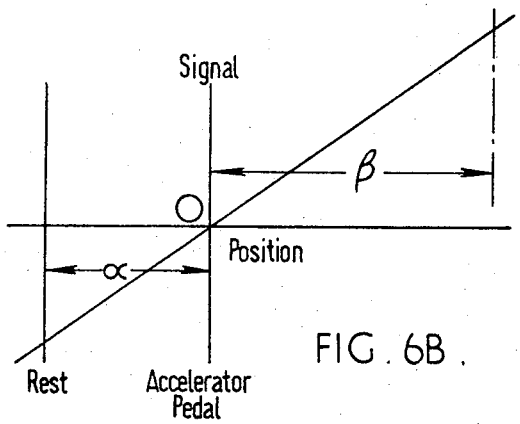

FIG. 6B shows the variation in electrical output signal with different positions of the acceleration pedal 10 and the linear change together with the two pedal movement ranges α and β during which regenerative braking and acceleration of the induction motor take place, as formerly, are clearly illustrated.

Figure 6C:
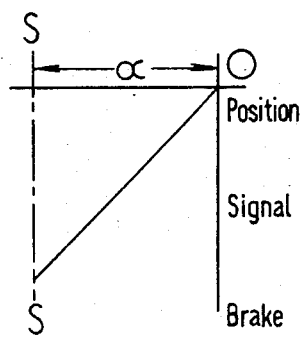

Likewise FIG. 6C shows how with gradual depression of the brake pedal 21 through the range α, there is a gradual increase in the regenerative braking signal fed to the induction motor inverter. At the end of the range, denoted by the broken line S—S, mechanical braking commences to supplement the regenerative braking.

Electromagnetic transducer connections suitable for use in such a system are described in "Handbook of transducers for electronic measuring systems" by H.N. Norton (Published by Prentice Hall) between pages 182 and 186.

A further form of transducer which may be used is an electro-optical one. This is provided by a closed chamber containing a light source and a photo-sensitive device such as a photo-electric cell. The quantity of light falling on the photo-sensitive device is controlled by an attenuator which is movable between the two and is positionally controlled by the accelerator pedal position. Such an arrangement has the advantage that no alternating current source such as is necessary with an electromagnetic transducer, is required.

SECOND MODIFICATION OF EMBODIMENT

Figure 7:
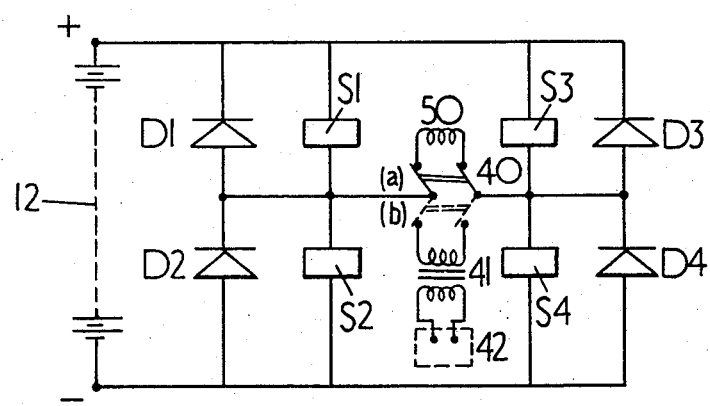

In the second modification shown in FIG. 7 and which concerns the inverter, the parts which are identical to those shown in FIG. 2 are correspondingly referenced. The alternating output terminals of the inverter which in FIG. 2 are connected directly to the induction motor winding are, in FIG. 7, taken instead to a double-pole double-throw switch 40 whose two positions (a), (b), are shown respectively in continuous and broken outline. In the former position the inverter is connected to the motor winding 50 for normal running of the car. The switch is moved to the second position when charging of the battery is necessary. In this case the inverter a.c. terminals are connected to the secondary side of a voltage dropping device provided by a transformer 41 whose primary side is connected to socket contacts 42 provided on the car. The socket contacts can have plugged into them a charging lead (not shown) from an a.c. domestic supply. The diodes $D_1 - D_4$ rectify this supply and feed it through the battery so that a separate battery charger is unnecessary.

Although in the above described embodiments the application of the invention is to a car having a manual gear box and pedal-operated clutch, it is to be understood that the invention is equally usable with an automatic gear change mechanism. In this case deceleration of the motor during periods when it is declutched to enable a lower gear ratio to be selected, may be effected by injecting a suitable component in the inverter bias signal to regeneratively brake the motor.

I claim:

1. A battery driven vehicle having an inverter provided with d.c. and a.c. terminals, a battery connected to said d.c. terminals, an induction motor powering said vehicle and connected to said a.c. terminals, biassing means controlling the frequency and power output of said inverter, an accelerator member having a rest position and consecutive first and second ranges of movement from said rest position, resilient means urging said member to said rest position, a transducer providing a first electrical signal which varies with movement of said member from said rest position, and speed sensitive means driven by said induction motor and providing a second electrical signal which is significant of the induction motor speed said first and second signals being fed to said biassing means to control the inverter frequency; in which vehicle the transducer provides said biassing means in the first range of member movement with a first signal which diminishes progressively in a range corresponding to the generation of negative torque by the induction motor and consequential regenerative braking, while progressive movement through the second range of member movement causes the first signal to accelerate the induction motor.

2. A vehicle as claimed in claim 1, in which said transducer produces a first electrical signal which varies linearly with displacement of the member from the rest position.

3. A vehicle as claimed in claim 1, in which the member comprises a pedal and the transducer operates electromagnetically to provide an analogue voltage output which varies linearly with pedal displacement and has one polarity in the first range and an opposite polarity in the second range.

4. A battery driven car having a solid state variable power and frequency inverter provided with a.c. and d.c. terminals, an induction motor powering said vehicle and connected to said a.c. terminals, biassing means controlling the frequency and power output of said inverter, an accelerator member having a rest position and consecutive first and second ranges of movement from said rest position, resilient means urging said member to said rest position, an independently-operated brake element giving two stages of braking, a first transducer providing a first electrical signal which varies with movement of said accelerator member from said rest position, a second transducer giving a brake control signal with movement of said brake element through an initial gentle-braking zone, a mechanical braking system actuated by said brake element when moved beyond said gentle-braking zone, speed-sensitive means driven by said induction motor and providing a second electrical signal which is significant of the induction motor speed, said first and second signals and said brake control signal being fed to said biassing means to control the inverter frequency; in which vehicle the signals produced by the second transducer and the first transducer when the member is in said first range of movement both correspond to the generation of a negative torque by the induction motor to produce a regenerative braking effect so that energy is returned to the battery, while the first signal progressively accelerates the induction motor when the accelerator is moved through the second range from the first range.

5. A car as claimed in claim 4, in which the transducers are both electromagnetic transducer assemblies each providing an analogue d.c. voltage output varying linearly with the magnitude of the displacement to which it responds.

6. A car as claimed in claim 4, in which the accelerator member and brake element comprise independently operated pedals.

7. A battery driven vehicle having an inverter provided with d.c. and a.c. terminals, a battery connected to said d.c. terminals, an induction motor powering said vehicle and connected to said a.c. terminals, an a.c. charging connection connected electrically to said a.c. terminals for charging the battery via the inverter, biassing means controlling the frequency and power output of the inverter, an accelerator member having a rest position and consecutive first and second ranges of movement from said rest position, resilient means urging said member to said rest position, a transducer providing a first electrical signal which varies with movement of said member from said rest position, and speed-sensitive means driven by said induction motor and providing a second electrical signal which is significant of the induction motor speed said first and second signals being fed to said biassing means to control the inverter frequency; in which vehicle the transducer provides said biassing means in the first range of member movement with a first signal which diminishes progressively in a range corresponding to the generation of a negative torque by the induction motor, while progressive movement through the second range of movement from the first range causes the first signal to accelerate the induction motor.

8. A car as claimed in claim 7, in which the a.c. charging connection comprises a voltage transformer having a high voltage side connected to contacts of a charging connector and a low voltage side connected to the inverter a.c. terminals, a charging switch being connected between said a.c. terminals and a phase winding of said induction motor.

9. A car as claimed in claim 7, including a double-pole double-throw switch having its moving contacts connected to the inverter a.c. terminals, one pair of fixed contacts connected to a phase winding of the induction motor, and the other pair of fixed contacts connected to a low-voltage side of a voltage dropping arrangement whose high voltage side is connected to contacts of a charging connector on the car.

10. A car as claimed in claim 7, in which the speed-sensitive means comprises a tachometer, the transducer provides a d.c. analogue voltage, and a second transducer which also provides a d.c. analogue voltage acting to decelerate the induction motor via the inverter is controlled by application of a brake on the car.

11. An electric drive system comprising an inverter provided with d.c. and a.c. terminals, a source of d.c. current connected to said d.c. terminals, an induction motor connected to said a.c. terminals, biassing means controlling the frequency and power output of said inverter, a speed control member having a rest position and consecutive first and second ranges of movement from said rest position, resilient means urging said member to said rest position, a transducer providing a first electrical signal which varies with movement of said member from said rest position, and speed sensitive means driven by said induction motor and providing a second electrical signal which is significant of the induction motor speed, said first and second signals being fed to said biassing means to control the inverter frequency; in which drive system the transducer provides said biassing means in the first range of member movement with a first signal which diminishes progressively in a range corresponding to the generation of negative torque by the induction motor and consequential regenerative braking, while progressive movement through the second range of member movement causes the first signal to accelerate the induction motor.

12. The electric drive system as claimed in claim 11 in which said inverter produces a minimum inverter frequency when the biassing means calls for an inverter frequency below that which will maintain a predetermined motor idle speed.

13. The electric drive system as claimed in claim 11 including a brake element giving two stages of braking, a second transducer giving a brake control signal with movement of said brake element through an initial gentle-braking zone, and a mechanical braking system actuated by said brake element when moved beyond said gentle-braking zone, said brake control signal being fed to said biassing means to control the inverter frequency; in which drive system the brake control signal produced by the second transducer corresponds to the generation of a negative torque by the induction motor to provide an additional regenerative braking effect.

* * * * *